Aug. 19, 1958    J. W. ROMINE    2,847,808
TREE WRAPPING MACHINE
Filed Sept. 6, 1956    3 Sheets-Sheet 1
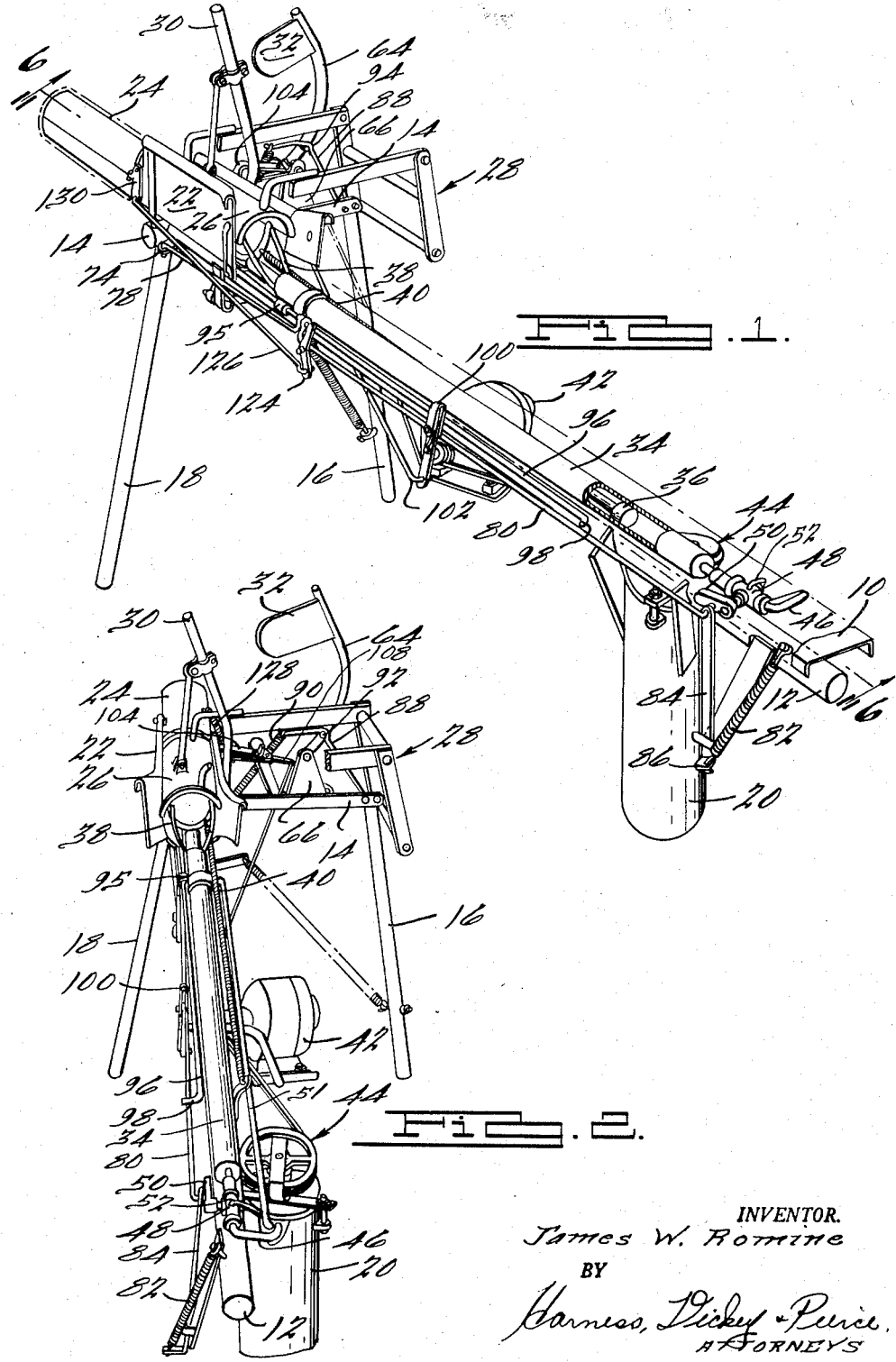
INVENTOR.
James W. Romine
BY
Harness, Dickey & Pierce
ATTORNEYS

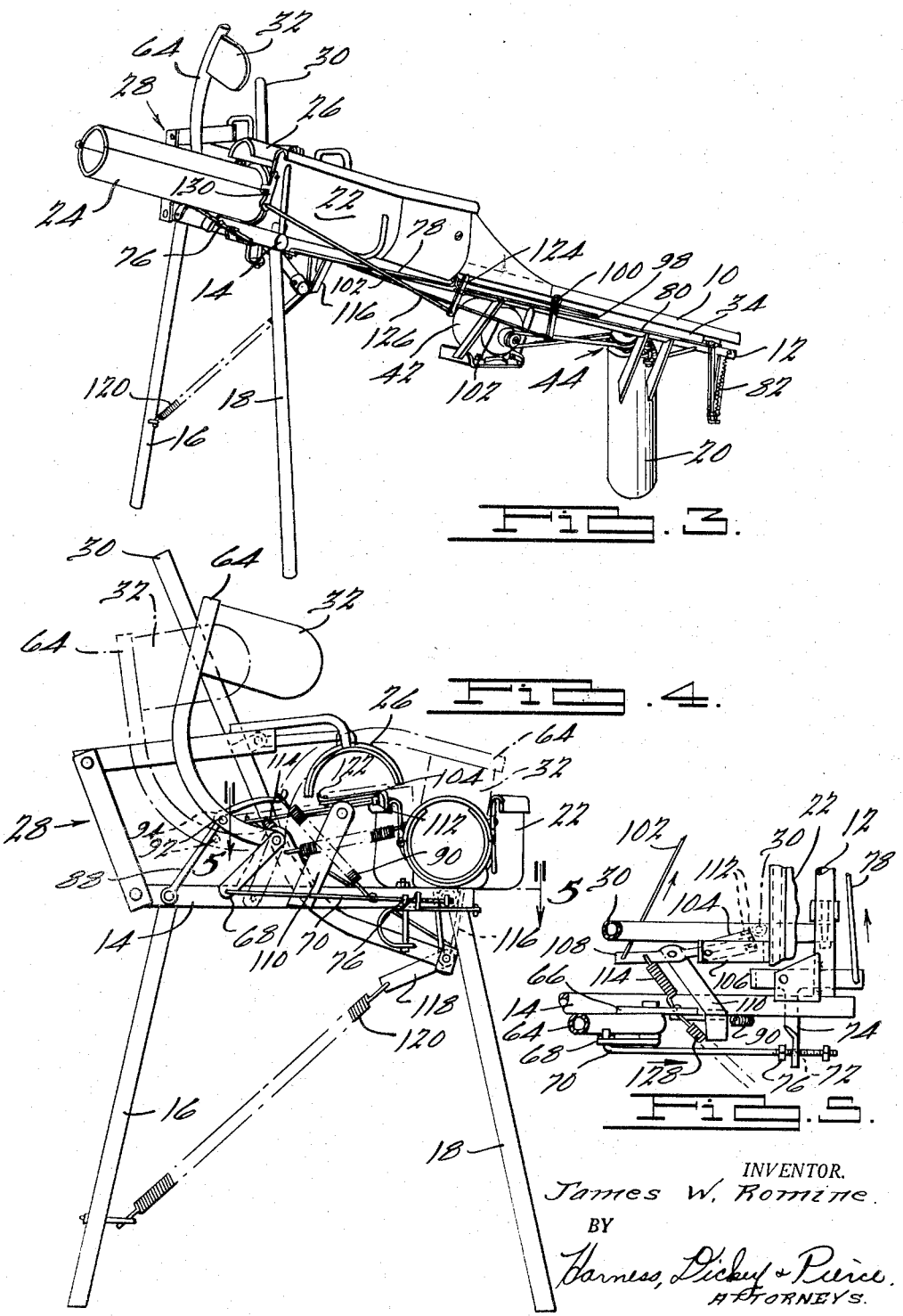

Aug. 19, 1958  J. W. ROMINE  2,847,808
TREE WRAPPING MACHINE
Filed Sept. 6, 1956  3 Sheets-Sheet 3
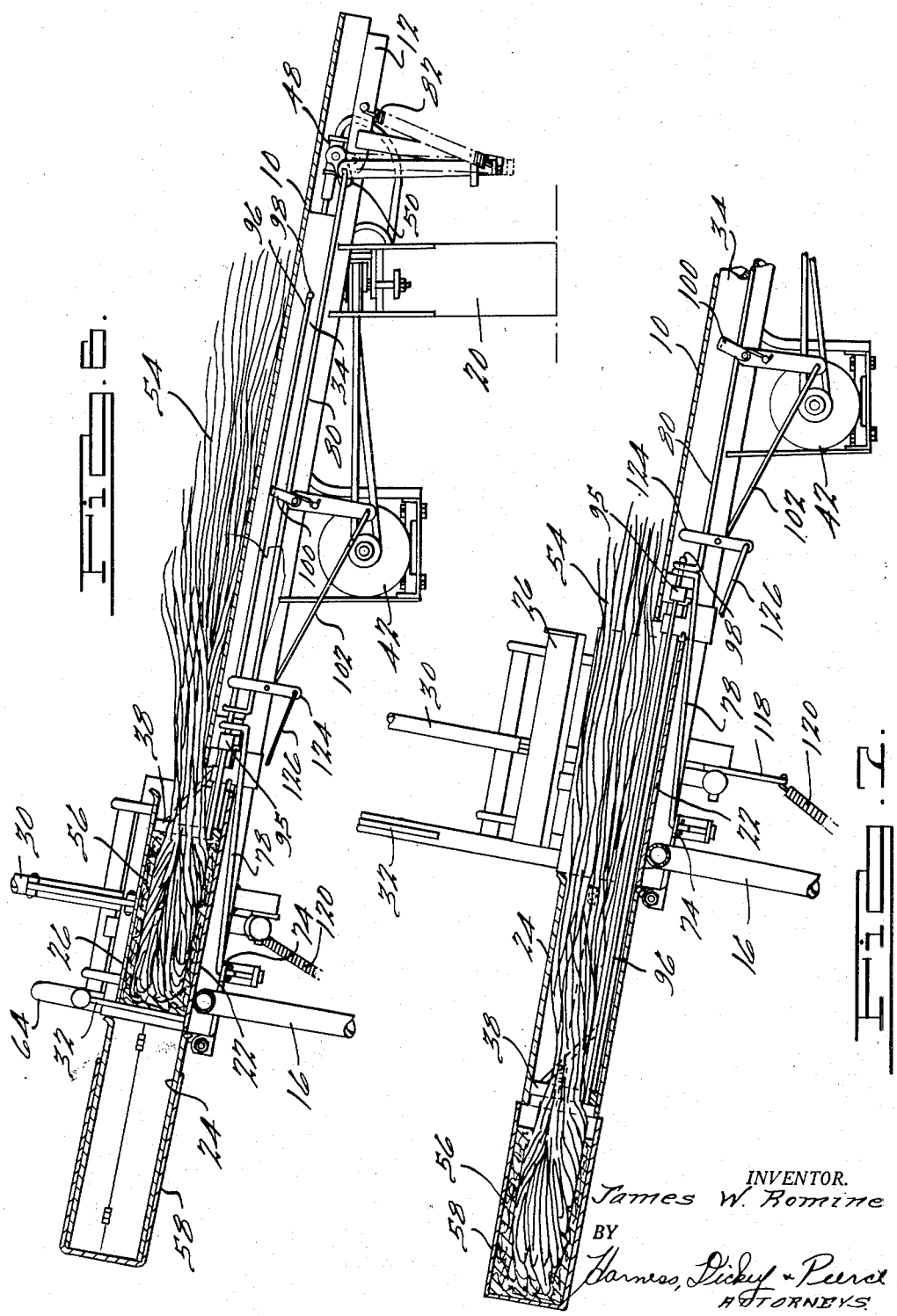
INVENTOR.
James W. Romine
BY
Harness, Dickey & Pierce
ATTORNEYS

United States Patent Office 2,847,808
Patented Aug. 19, 1958

2,847,808

TREE WRAPPING MACHINE

James Wilbur Romine, Monroe, Mich., assignor to Greening Nursery Company, Monroe, Mich., a corporation of Michigan Application September 6, 1956, Serial No. 608,360

7 Claims. (Cl. 53—124)

This invention relates to an improved tree bagging apparatus and more particularly to improved apparatus to facilitate the bagging of tree roots together with material to preserve the roots for shipment and storage.

One object of the instant invention is to improve tree root bagging apparatus. Another object is to provide improved apparatus for packing preservative material around the roots of trees and for automatically inserting the roots together with the preservative material into a bag or wrapper. Another object is to provide improved apparatus to support a tree, to compress preservative material around the roots thereof, and to insert the roots together with the preservative material into a wrapper while maintaining the roots and the preservative material in a shaped, lightly compressed mass.

Other objects and features of novelty of the invention will be specifically pointed out or will become apparent when referring, for a better understanding of the invention, to the following description taken in conjunction with the accompanying drawings, wherein:

Figure 1 is a perspective view of a tree root bagging machine of the present invention;

Fig. 2 is another perspective view of the machine shown in Fig. 1;

Fig. 3 is still another perspective view of the machine shown in Fig. 1;

Fig. 4 is an end view in elevation of the machine illustrated in the preceding figures;

Fig. 5 is a sectional view of a portion of the machine illustrated in Fig. 4, taken along the line 5—5 thereof;

Fig. 6 is a sectional view of the machine illustrated in Fig. 1, taken along the line 6—6 thereof before the tree is advanced to have its roots disposed within the packing container, and Fig. 7 is a view of the machine illustrated in Fig. 1, with the tree advanced to have its roots disposed within the packing container.

Referring to the drawings, a tree wrapping machine of the present invention comprises a table 10 for supporting a sapling or small tree in a horizontal position. The table 10 is mounted upon a tripod frame comprising a longitudinal bar 12, a transverse bar 14 and three legs 16, 18 and 20, one of which may be a tank 20 for a fluid which is utilized for the operation of the machine. A trough 22 is positioned at one end of the tripod in extension of one end of the table 10 to receive the roots of a tree when placed upon the table as well as the preservative material which is compressed lightly about the roots to form a shaped mass. A hollow mandrel in the form of a split cylinder 24 is also supported by the tripod assembly in aligned extension of the trough 22. The mandrel 22 supports a paper bag, wrapping material or other container upon its outer surface. A shoe 26 is pivotally mounted upon one leg 16 of the tripod by means of a link assembly 28 and is swingable by a lever arm 30 to further compress the preservative material about the roots within the trough 22 and to form it into a cylindrical mass. A back plate 32 is swingably mounted upon the tripod in position selectively to close the end of the trough 22 adjacent to the mandrel 24 to facilitate the compressing and packing of the material. The cylindrical form of the resulting mass permits the mass to be pushed from the end of the trough into and through the mandrel into the container which advances off of the mandrel as the mass is advanced therethrough.

A hydraulic cylinder 34 is mounted upon the longitudinal bar 12 beneath the table 10. A piston 36 of the cylinder 34 is connected to a yoke 38 which is advanced by the piston through the trough 22 and the split cylinder or mandrel 24. The yoke 38 is adapted to engage a mass of free roots and preservative material compressed within the trough 22 and to push the mass through the trough and the split cylinder 24 when the piston in the hydraulic cylinder 34 is advanced. The yoke 38 is biased toward its normal retracted position by a spring 40 as illustrated in Fig. 2. The yoke 38 is of U-shape and when in the trough 12 is disposed on the side of the stock or branches opposite to that of the shoe or cover 26 when the shoe or cover is positioned over the trough. Hydraulic fluid for operating the piston in the hydraulic cylinder 34 may be stored in the tank 20 which serves also as one support for the apparatus. A conventional hydraulic pump (not shown) is positioned within the tank 20 and driven by an electric motor 42, mounted upon the longitudinal bar 12, through a pulley and belt drive generally designated 44. The output of the pump is delivered to the hydraulic cylinder 34 through a tube 46 and a valve 48 actuated by a lever 50 when the lever is moved to downward position. Hydraulic fluid is returned from the cylinder into the reservoir when the valve is in the position illustrated in Fig. 1 with the lever 50 in forward position. The elements for producing the actuation of the valve 48 to the two positions will be described in detail hereafter.

The details of the control mechanism of the machine may best be understood from a description of the operation thereof, the general principles of which are illustrated in Figs. 6 and 7. Fig. 6 shows the machine as it appears after completion of the first part of a tree bagging operation. A tree 54 is laid upon the table 10 with its roots lying in the trough 22 and abutting the back plate 32, which is swung into position at the end of the trough. Packing material 56 such as a mixture of peat moss and sawdust is placed in the trough around the roots, and the shoe 26 is swung down into the trough to compress the packing material and the roots and form a cylindrical mass corresponding to the shape and dimension of the interior of the cylinder formed by the trough 22 and shoe 26. The shoe 26 is latched in position within the trough 22, and the back plate 32 is then swung upwardly away from the trough. A paper bag 58 is slid forwardly onto the split cylinder 24 in position to receive the tree roots and packing material.

The back plate 32 is next swung upwardly away from the trough 22 and to the rear sufficiently to operate the valve 48 and produce the advancement of the piston 36 in the hydraulic cylinder 34 to push the tree roots and packing material forwardly through the trough 22 and the split cylinder 24. In their passage through the split cylinder 24 the roots and the packing material 56 engage the end of the paper bag 58 and slide it off the split cylinder 24 as the roots and material pass therefrom. The split cylinder is opened and the shoe 26 is retracted to release the tree trunk and branches. Upon the reversal of the valve 48 the piston 36 in the hydraulic cylinder 34 withdraws the yoke 38 back to its initial position and the machine is ready for a second operation.

As pointed out above, the piston 36 is advanced forwardly in the hydraulic cylinder 34 by manually retracting the back plate 32 and moving it past its normal retracted position. The back plate 32 is rigidly attached to an arm 64 which is pivoted upon a bracket 66 (shown most clearly in Fig. 2) and mounted on the transverse bar 14 of the tripod assembly. The arm 64 carries an extension 68 which is connected to a push rod 70. The push rod 70 extends through an aperture 72 in one arm of a bell crank 74 for movement relative thereto limited by a pair of stop nuts 76 threaded upon the push rod 70. When the back plate 32 is fully retracted into the position shown in dot and dash lines in Fig. 4, the push rod 70 moves the crank 74 to advance a second push rod 78. This second push rod 78 bears against a valve control rod 80 (Figs. 1–3) and moves the lever 50 to open the valve 48 which admits hydraulic fluid under pressure into the cylinder 34. The lever 50 is also connected to a spring 82 by a floating link 84 through a flange 86 thereof. The valve is spring biased to connect the cylinder to tank in one position and retain the valve open to supply oil from the pump to the cylinder when the arm 50 of the valve is in vertical position.

The back plate 32 is biased toward its normal position, shown in solid lines in Fig. 4, by a notched detent lever 88 pivoted upon the transverse arm 14 and tensioned by a spring 90. A pin 92 extends laterally from the arm 64 and slidably engages the lever 88. Normally, the pin 92 rests in the notch 94 of the lever, and when the back plate 32 is fully retracted beyond its normal position, the pin 92 slides out of the notch 94, thus moving the lever 88 against the urging of the spring 90. When the back plate 32 is released, the lever 88 cams the pin 92 to return the back plate to its normal upright position.

Referring now to Fig. 1, when the valve 48 is opened hydraulic fluid enters the cylinder 34 and advances the piston 36 and the yoke 38 forwardly to push the contents of the trough 22 out of the trough and into and through the split cylinder 24. The yoke 38 carries an actuating rod 96 extending rearwardly from the yoke through a fixed bushing 95 along one side of the cylinder 34. The actuating rod 96 is bent outwardly at its far end to form a leg 98 which engages a trip lever 100 when the yoke has partially completed its travel, i. e., when it has passed completely through the trough 22 and is about to enter the split cylinder 24. The trip lever 100 is pivoted upon the longitudinal bar 12 of the tripod frame and operates a rod 102 to operate a latch to release the shoe 26 so that it may retract from the trough 22 to permit the passage of branches and foliage of the tree 54 through the trough.

Referring now particularly to Figs. 4 and 5, the shoe 26 is latched in position in the trough 22 by a spring biased catch assembly best shown in Fig. 5. The catch assembly includes a keeper 104 pivoted on a bracket 106 mounted upon the edge of the trough 22. The keeper 104 is actuated by a lever 108 pivoted upon a bracket 110 mounted upon the transverse rod 14. The keeper 104 includes a pair of downwardly extending fingers 112 which are engaged by opposite side edges of the lever 108, the opposite end of the lever being engaged by the rod 102. The lever 108 is biased to swing the keeper into the path of the shoe arm 30 by a spring 114. When the shoe arm 30 is advanced to position the shoe 26 in the trough 22, it cams the keeper 104 against the bias of the spring 114 until the arm 30 is fully advanced whereupon the keeper 104 snaps into position behind the arm 30 to latch the shoe 26 within the trough 22. The arm 30 is pivoted on a bracket 116 welded to the longitudinal bar 12, and carries an extension 118 on its lower end. A spring 120 is attached between the extension 118 and the leg 16 of the tripod for retracting the arm 30 and swinging the shoe 26 out of the trough 22 when the arm 30 is unlatched due to the pull on the rod 102.

When the yoke 38 passes the far end of the trough 22 and enters the split cylinder 24, leg 98 on the actuating rod 96 passes the trip lever 100, and when the yoke approaches the far end of the split cylinder 24 the actuating leg 98 engages a lever 124 which moves a rod 126 to operate a latch 130 and release the upper half of the split cylinder 24. The upper half of the cylinder 24 is best shown in Figs. 2 and 4 is biased toward its open position by a spring 128. When the latch 130 is released the upper half of the cylinder opens to release the tree 54 so that it may be removed from the bottom half. As the actuating arm 98 progresses past the lever 124, it engages the upstanding end of the valve control rod 80 to reverse the valve 48 to connect the fluid in the cylinder to tank and to permit the hydraulic piston 36 to be retracted to the lower end of the cylinder 34 by the spring 40.

In a practical operation of the machine, the back plate 32 is first swung into position at the end of the trough 22, and some root packing material 56 is placed in the bottom of the trough. A tree is then laid upon the table 10 with its roots upon the packing material in the bottom of the trough. Additional packing material 56 is placed loosely around the roots of the tree in the top of the trough and the shoe 26 is swung downwardly thereover and latched to compress the packing material around the roots of the tree to form a cylindrical mass. A bag 58 into which the roots and packing material are to be inserted is placed over the split cylinder 24 as illustrated in Fig. 6. The back plate 32 is then fully retracted as shown in Fig. 4 to move the rods 78 and 80 to the right to operate the valve 48 and admit oil to the cylinder 34. The piston 36 drives the yoke 38 to push the roots and packing material forwardly out of the trough into and through the split cylinder 24, thus inserting the cylindrical mass of roots and packing material into the bag 58 as it is moved from the split cylinder 24. As the yoke passes from the trough 22, the shoe 26 is automatically retracted, by the operation of the rod 102, lever 108 and keeper 104. When the yoke 38 reaches the end of the split cylinder 24 and the bag 58 has been moved therefrom, the latch 130 is released by the rod 126 to permit the upper portion of the split cylinder 24 to swing to open position. Near the end of the yoke travel the end 98 of the rod 96 engages the upstanding end of the rod 80 to operate the valve 48 and connect the oil in the cylinder 34 to tank to permit the spring to return the piston 36 and yoke 38 to their initial positions.

There has thus been described improved apparatus for packaging roots of trees and large shrubs. The apparatus includes a shaped container for holding the roots of trees or shrubs and for forming them, together with preservative material, into a compacted cylindrical mass. It also includes a split retaining sleeve aligned with the trough for holding a wrapping medium such as a bag into which the compacted roots and preservative material are advanced as the bag is progressively moved from the split retaining sleeve.

What is claimed is:

1. In a device for packaging a body portion of an element having an extending portion of thinner cross-section in combination, a support, troughlike means secured to said support, cover means for said troughlike means, said cover means being movable toward the troughlike means for compacting the body portion of the element, said cover means forming a tube with said troughlike means for slidably receiving a package thereover into which the body portion of the element is to be inserted, and pusher means comprising a member for engaging and advancing the body portion through the troughlike means into the package as the package is advanced from said troughlike means, said member being disposed adjacent to the wall of the troughlike means and on the opposite side of said extending portion from the cover means when the cover means has been moved into position to form a tube with the troughlike means, whereby the packaged body portion and the extending portion may be released from the device when the cover means is moved away from the troughlike means.

2. A device for packaging the roots of a plant having an extending portion to be disposed outside of the package including, in combination, troughlike means open at one side, closure means for said troughlike means for compacting material around said roots and forming a tunnel over which a bag may be placed, pusher means comprising a member disposed adjacent to said troughlike means and on the opposite side of said extending portion from said closure means when said closure means is in tunnel-forming position, said member being engageable with the packed material and roots for pushing the packed material and roots from the troughlike means into the bag as the bag is pushed from the forward end of the troughlike and closure means, whereby upon moving said closure means from the troughlike means the extending portion may be lifted therefrom and from the pusher means.

3. A device for packaging the roots of a plant having an extending stock including, in combination, a supporting frame, an upwardly open troughlike element secured to the frame, a shoe movably mounted upon the frame for movement downwardly into the troughlike element, a longitudinally split openable tubular element mounted on the frame outwardly of said troughlike element and in alignment therewith and over which a package to receive the roots may be disposed, and means for engaging and pushing the root end of a plant within the troughlike element therefrom and through said tubular element into said package as the package is pushed from the split tubular element which is thereafter opened to release the stock, said pushing means comprising a root end engaging member disposed adjacent to the wall of the troughlike element and on the opposite side of the extending stock from said shoe when said shoe has been moved into the troughlike element.

4. A device for packaging an article including in combination, a base member, an upwardly open troughlike element fixedly mounted on the base member, a shoe movable into position over said troughlike element to close the same, a plate movable across one end of the troughlike element for closing the cavity formed by the shoe therewith, a forward extension of said troughlike element, a hinged cover on said extension spring-biased away from said extension, a latch holding said cover in engagement with said extension over which the package to be filled may be drawn, a pusher member movable through the troughlike element and extension, and means for advancing said pusher member.

5. A device for packaging the roots of stock such as trees, shrubs and the like including, in combination, a support, a troughlike element mounted on said support to receive said roots, a cover movably mounted on said support into and from engaged position with said troughlike element to form a generally cylindrical cavity in which the roots and packing material may be compacted, means for maintaining said cover in engaged position so that a container may be placed thereover, and means on said support for advancing said roots and material from said troughlike element and cover into the container as the container is advanced therefrom, said cover being thereafter movable from said troughlike element to permit the roots and stock to be removed from the device, said means for advancing said material and roots comprising a movable element disposed within the troughlike element and on the opposite side of said stock from said cover when said cover is in engaged position.

6. A device for packaging the roots of a plant having extending branches which includes, in combination, a supporting frame, troughlike means having an open side mounted on said frame, cover means movable into a position for closing said side and compacting material about the plant roots, a pushing element movable within the troughlike means and disposed on the opposite side of said extending branches from said cover means when said cover means has been moved into said closing position, and means for advancing said pushing element for moving said roots and material from said troughlike and cover means into a container placed thereon and advanced therefrom, said cover means being thereafter movable from the troughlike means to permit the extending branches to be removed laterally from the device along with said container and packaged roots.

7. A device for packaging the roots of a plant having extending branches which includes, in combination, a supporting frame, troughlike means having an open side mounted on said frame, cover means movable into a position for closing said side and compacting material about the plant roots, a pushing element movable within the troughlike means, said pushing element comprising a yoke member of U-shape, the open side of said U-shaped member presenting toward the cover means when the cover means is in closing position, and means for advancing said pushing element for moving said roots and material from said troughlike and cover means into a container placed thereon and advanced therefrom, said cover means being thereafter movable from the troughlike means to permit the extending branches to be removed laterally from the device along with said container and packaged roots.

References Cited in the file of this patent

UNITED STATES PATENTS

| | | |
|---|---|---|
| 1,588,558 | Thornton | June 15, 1926 |
| 2,393,102 | Gribner | Jan. 15, 1946 |
| 2,540,272 | Malmstrom et al. | Feb. 6, 1951 |
| 2,698,500 | Clegg | Jan. 4, 1955 |